United States Patent
Langlard

(10) Patent No.: US 10,389,199 B2
(45) Date of Patent: Aug. 20, 2019

(54) ROTARY ELECTRIC MACHINE STATOR FITTED WITH OPTIMIZED COIL

(71) Applicant: SKYAZUR, Wasquehal (FR)

(72) Inventor: Nicolas Langlard, Loos (FR)

(73) Assignee: SKYAZUR, Wasquehal (FR)

( * ) Notice: Subject to any disclaimer, the term of this patent is extended or adjusted under 35 U.S.C. 154(b) by 363 days.

(21) Appl. No.: 15/305,218

(22) PCT Filed: Apr. 28, 2015

(86) PCT No.: PCT/FR2015/051159
§ 371 (c)(1),
(2) Date: Oct. 19, 2016

(87) PCT Pub. No.: WO2015/166188
PCT Pub. Date: Nov. 5, 2015

(65) Prior Publication Data
US 2017/0040859 A1    Feb. 9, 2017

(30) Foreign Application Priority Data
Apr. 29, 2014   (FR) .................................... 14 53874

(51) Int. Cl.
*H02K 3/04*   (2006.01)
*H02K 3/28*   (2006.01)
(Continued)

(52) U.S. Cl.
CPC ................ *H02K 3/28* (2013.01); *H02K 3/12* (2013.01); *H02K 15/0068* (2013.01); *H02K 15/064* (2013.01); *H02K 15/085* (2013.01)

(58) Field of Classification Search
CPC .................................................... H02K 3/12
(Continued)

(56) References Cited

U.S. PATENT DOCUMENTS 4,893,400 A * 1/1990 Chenoweth ......... H01F 41/0226
                                                     29/606
5,196,752 A   3/1993 Palma
(Continued)

FOREIGN PATENT DOCUMENTS

DE   1 026 841 A    3/1958
FR   2 779 883 A1   12/1999
(Continued)

OTHER PUBLICATIONS

International Search Report, dated May 30, 2016, from corresponding PCT Application.

*Primary Examiner* — Alexander Talpalatski
(74) *Attorney, Agent, or Firm* — Young & Thompson

(57) ABSTRACT

A stator (1) of a rotary electric machine includes a body (2) provided with slots (15), a coil (3) constituted of windings (4, 5, 6, 7, 8) that include first conductive segments (19) equipped with two first branches and second conductive segments (25) provided with two second branches. Each conductive segment is coated with insulation except for the presence of a bared surface on each one of the branches. The shapes of the bared surfaces complement one another. The first and second conductive segments are arranged in a staggered configuration and in opposite directions successively one after the other, with each slot accepting first branches and second branches positioned opposite with the bared surfaces thereof respectively in contact with one another in such a way as to form a continuous wire. The stator includes elements for keeping the bared surfaces in contact with one another in the slots.

16 Claims, 12 Drawing Sheets

(51) Int. Cl.
*H02K 3/12* (2006.01)
*H02K 15/06* (2006.01)
*H02K 15/00* (2006.01)
*H02K 15/085* (2006.01)

(58) Field of Classification Search
USPC .......................................................... 310/201
See application file for complete search history.

(56) References Cited

U.S. PATENT DOCUMENTS

| | | | |
|---|---|---|---|
| 5,477,095 A | 12/1995 | Kleinburger et al. | |
| 5,804,902 A * | 9/1998 | Hill | H02K 3/12 310/116 |
| 5,936,326 A * | 8/1999 | Umeda | H02K 1/165 310/179 |
| 6,140,735 A | 10/2000 | Kato et al. | |
| 7,071,807 B1 * | 7/2006 | Herbert | H01F 7/2847 336/200 |
| 7,391,138 B2 * | 6/2008 | Seguchi | H02K 3/28 310/71 |
| 8,772,995 B2 * | 7/2014 | Ogihara | H02K 3/12 310/184 |
| 8,957,562 B2 * | 2/2015 | Kinpara | H02K 3/12 310/180 |
| 2002/0053853 A1 | 5/2002 | Nishimura | |
| 2003/0011268 A1 | 1/2003 | Even et al. | |
| 2003/0067239 A1 | 4/2003 | Nakamura | |
| 2004/0046475 A1 | 3/2004 | Holzheu et al. | |
| 2004/0164637 A1 | 8/2004 | Seguchi | |
| 2005/0006972 A1 | 1/2005 | Bradfield | |
| 2005/0269890 A1 | 12/2005 | Gorohata et al. | |
| 2010/0295393 A1 | 11/2010 | Dunesme et al. | |
| 2013/0300246 A1 * | 11/2013 | Kaimori | H02K 3/32 310/201 |
| 2016/0172919 A1 * | 6/2016 | Hattori | H02K 3/12 310/208 |

FOREIGN PATENT DOCUMENTS

| | | |
|---|---|---|
| FR | 2 816 459 A1 | 5/2002 |
| FR | 2 819 117 A1 | 7/2002 |
| FR | 2 830 694 A1 | 4/2003 |
| FR | 2 844 646 A1 | 3/2004 |
| FR | 2 857 519 A1 | 1/2005 |
| FR | 2 871 307 A1 | 12/2005 |
| FR | 2 918 815 A1 | 1/2009 |
| FR | 2 939 251 A1 | 6/2010 |
| WO | 02/50977 A2 | 6/2002 |

* cited by examiner

ROTARY ELECTRIC MACHINE STATOR FITTED WITH OPTIMIZED COIL

This invention relates to a rotary electric machine stator, which can operate as a motor or as a generator. A particular application relates to alternators in the automobile field. Other applications can however be considered, for example generators in the wind turbine field. The main objectives of the invention are to optimise the output of the machine and the cost of manufacture thereof.

Such as is known, a stator comprises a body, also called a core, which is comprised of a packet of steel sheets and which comprises slots. The slots are for example of a longitudinal shape parallel to the axis of the body, with said axis being confounded with the axis of rotation of the rotor of the rotary electric machine. These slots extend radially circumferentially around the body and are separated between them by teeth. The teeth can each comprise at the radial end thereof, a tooth root that extends circumferentially on each side of said tooth in such a way as to partially and respectively close the two slots adjacent to this tooth.

The stator further comprises a polyphased coil constituted of several windings of turns arranged by layers in the slots; at least one winding per phase on each layer, said phases being connected together. For example, the stator can include three phases connected as a triangle or as a star, with each phase comprising two windings connected in series or in parallel. Each winding comprises branches each mounted in a slot, with these branches being connected together, outside of a first longitudinal side of the body of the stator, by connector heads, in such a way as to form a first bun and, outside of a second longitudinal side of said body, by connection legs, in such a way as to form a second bun. These first and second buns make it possible to cool the coil. A slot insulation, for example comprised of a resin or a sheet of paper, coats the slots in such a way as to physically separate them from the branches of the windings of the coil.

Different designs of stators of rotary electric machines are known to those skilled in the art.

According to a first design of the windings of the coil, the latter are carried out electrically conductive continuous wires, for example made of copper, which are coated with an insulation such as enamel. Such a design is for example described in patent applications published under number FR 2 918 815 A1, FR 2 939 251 A1 and FR 2 779 883 A1, in which the windings of continuous wires are carried out in an undulated manner. The shape of the transversal section of the wire can be round or rectangular, for example. This first design of the windings of the coil has various disadvantages, according to the different possible implementations of the body of the stator.

Indeed, when the body of the stator is constituted of a single part, such as illustrated in documents FR 2 918 815 A1 and FR 2 939 251 A1, the continuity of the wires requires radially engaging the windings in the slots; the wires are subjected to stresses when they are put into place, which risks damaging the coating of insulation and can therefore generate a short-circuit between the wires of the coil. Furthermore, it is necessary to limit the size of the tooth roots, and even suppress them, in order to allow for the introduction of wires in the slots, which reduces the electromagnetic exchange between the stator and the rotor of the machine. The stresses are substantial during the introduction of the copper wires into the slots in the presence of tooth roots, which requires preserving a sufficient thickness of the slot insulation in order to prevent a possible short-circuit between the body and the coil; this thickness of slot insulation reduces the filling rate of the slots. Moreover, it is necessary to use shims for maintaining wires in order to block the passages between the tooth roots and to prevent the release of these wires outside of the slots. These maintaining shims also reduce the filling rate of the slots. Consequently, this filling rate of the slots cannot exceed a percentage of about 60%, which limits the output of the machine.

According to an alternative embodiment of the body of the stator, the latter is comprised of portions each constituting a tooth, said portions being assembled together circumferentially in order to form said body with the slots thereof. The wires of the windings are positioned beforehand in the zones corresponding to the slots, before the junction of the portions. Such a design appears for example in the document FR 2 779 883 A1. This design makes it possible to position the wires in the slots without stress, which prevents damaging them and, therefore, generating short-circuits. This design also allows for a better filling rate of the slots, of about 70%, and to retain tooth roots of an optimum width, which improves the output. This type of stator is however complex to implement due to the assembly of the body having to be carried out in situ. This design furthermore requires the adding of strapping parts for maintaining the portions together, which also complicates the method for manufacturing the stator.

Furthermore, for this type of winding constituted of a continuous wire, the phase inputs cannot be placed where desired. It is possible to separate these phase inputs for certain coil designs, but in a well-defined manner. For other coil designs, the stress is greater since it is necessary to place all of the phase inputs together, in a compacted manner. This presents a disadvantage for the connection of the phase inputs with the diode bridge making it possible to rectify the current at the alternator output.

According to a second design of the windings of the coil, the latter is implemented using U-shaped conductive segments, also called pins, having two branches connected together by a connector head. These conductive segments are for example made of copper and coated with insulation, for example enamel, except on the ends of the branches. The branches of the conductors are all introduced in a longitudinal direction inside the slots in such a way as to form the turns of each phase, over several layers. The connector heads of the conductive segments then form a first bun of a first side of the body of the stator. The bared ends of the branches are deformed after the passing thereof through the slots, which makes it possible to connect them together in order to constitute the windings of the phases. The deformed end portions of the branches connected together form connecting legs and a second bun of the second side of the body of the stator. The connections between the bared ends are carried out by welding or by means of connection sleeves. The design of this type of winding is for example described in patent applications published under numbers FR 2 871 307 A1, FR 2 857 519 A1, FR 2 844 646 A1, FR 2 830 694 A1 and FR 2 819 117 A1. The introducing of the branches of the conductive segments in the longitudinal direction of the slots has for advantage to retain the presence of the tooth roots, allowing for a better electromagnetic exchange between the stator and the rotor. This direction of introduction of the branches in the slots further facilitates the use of a rectangular section for the conductive segments, which allows for a better filling rate of the slots, of about 70%. The manufacture of this type of stator is however complex, since it is suitable for deforming the branches of the conductors in situ after the passage thereof in the slots, in order to connect them. The carrying out of welds, in situ, furthermore requires extreme precision in order to not short-circuit the windings of the coil. These welds furthermore generate a substantial amount of material waste. In an alternative, certain manufactures provide preformed conductive segments which are introduced radially in the slots before welding the ends of the bared branches which are connected together in the first bun and in the second bun. This alternative has for disadvantages to suppress or to limit the tooth root in order to allow for said introduction and to double the number of welds.

According to a third design of the windings of the coil, described in patent application FR 2 816 459 A1, these windings are carried out by means of U-shaped conductive segments which are initially bared. First conductive segments are arranged in one direction and second conductive segments, of a design identical to the first, are arranged in the reverse order. These first and second conductive segments are arranged in a staggered configuration, which makes it possible to connect between them the respective adjacent branches thereof. These adjacent branches are then welded together, which makes it possible to from units of conductive segments, which are then coated with insulation of the enamel type. Units of conductive segments are then connected together in order to constitute a phase winding. This design has for purpose to insert the units of conductive segments in order to improve the assembly performances. This does not prevent the disadvantages mentioned hereinabove for the first design of coil windings, from remaining according to this third design. Indeed, these conductive segment units must be inserted in the radial direction of the slots, which requires reducing and even suppressing the tooth roots of the slots. Likewise, it is suitable to use shims for maintaining windings inside the slots.

U.S. Pat. No. 5,804,902 A is also known which describes a multi-phase electric machine of which the windings of the coil are implemented by means of conductive segments in the shape of a U. Initially, these segments have two branches each with a bared contact surface, which makes it possible to join the bared segments arranged successively one after the other in order to form a winding. These conductive segments are then welded together in the zones of contact in order to form the winding, then this winding is coated with insulation. The windings are therefore carried out upstream of the assembly phase with the body and, as hereinabove for the method of design described in patent application FR 2 779 883 A1, the body of the stator is necessarily constituted of portions of body each one forming a tooth, said portions being inserted around the windings then assembled together circumferentially in order to form said body with the slots thereof. The aforementioned disadvantages for patent application FR 2 779 883 A1 therefore also appear with such a design of a rotary electric machine.

In an entirely different field, without any measure with the stators of rotary electric machines, U.S. Pat. No. 7,071,807 B1 describes a matrix transformer intended for electronic circuits. This matrix transformer comprises a magnetic body comprised of one or several separate magnetic cores, accepting a single rolled primary winding. In an embodiment of this rolled primary winding, the latter comprises two U-shaped portions each constituted of several U-shaped rolled layers with progressive lengths, with said layers being superimposed and insulated from one other. As such, the two branches of each portion have bared surfaces arranged in cascade. These two U-shaped portions are inserted opposite each one on one side of the core and the first bared surfaces of the branches of the first portion come into contact with the second bared surfaces of the branches of the second portion, which makes it possible to constitute the primary winding. The first and second bared surfaces are tinned by means of a soldering paste before being put into contact, then means of clamping are positioned outside of the magnetic body, i.e. outside of the core or between the cores separate from one another, in such a way as to temporarily maintain the first and second bared surfaces compressed between them. After which, the transformer is heated so that the soldering paste melts and provides the junction between the first and second bared surfaces. Such an implementation cannot be considered on a rotary electric machine stator of which the designs of the single-block body with slots and polyphased coil are without comparison with those of the magnetic core and of the primary winding of the matrix transformer. Furthermore, the design of the single-block body with slots and that of the polyphased coil, of which the windings of the turns are inserted into the slots by going around the body, require the presence of two buns, each one on one side of the body, and of means for connecting in a triangle or in a star between the phases of the coil. This cannot allow for the setting up of the means for clamping of each side of said single-block body in order to temporarily maintain bared surfaces coming into contact after having been first started with soldering paste, the time to allow for the curing of the stator and the fusion of the soldering paste.

This invention makes it possible to overcome the aforementioned disadvantages of the various coil winding designs of rotary electric machines, and aims to optimise the output of the rotary electric machine, the method of manufacturing the stator and the cost of manufacturing thereof.

To this effect, the invention relates to a rotary electric machine stator comprising a body constituted of a packet of steel sheets and forming a single-block element. This body is provided with slots which are arranged longitudinally and which extend radially and circumferentially on said body. These slots are coated with a slot insulation. The stator also comprises polyphased coil constituted of several windings of turns arranged by layers in the slots. The number of phases and the number of windings for each phase are variable according to the design desired. Likewise, the connection between the windings of each phase and the connection between the phases are variable according to the design desired. By way of example, the coil can comprise three phases connected as a star, with each phase being constituted of two windings arranged on six layers in the slots, said two windings able to be connected together in series or in parallel. According to another example, the coil can comprise a first set of three phases connected together as a star and a second set of three phases connected together as a star, with the two sets of three phases as a star being out of phase between them. Other examples can be considered without leaving the scope of the invention.

Remarkably, according to the invention, each winding of the coil comprises, on the one hand, first conductive segments in the shape of a U each provided with a first connector head extended at the ends thereof by two first branches. Each first conductive segment is coated with insulation except for the presence of a first bared surface on each one of the first branches. On the other hand, each winding of the coil also comprises second U-shaped conductive segments each provided with a second connector head extended at its ends by two second branches. Each second conductive segment is also coated with insulation except for the presence of a second bared surface on each one of the second branches. Furthermore, the form of the first bared surface and the shape of the second bared surface complement one another. The first conductive segments and the second conductive segments are arranged in a staggered configuration and in opposite directions successively one after the other. Each slot receives, for each turn and each layer of a winding arranged in this slot, respectively a first branch and a second branch positioned opposite with the first bared surface thereof and the second bared surface thereof in contact with one another in such a way as to form a continuous conductive wire. Moreover, said stator comprises means for maintaining configured to maintain the first and second bared surfaces in contact, one against the other in the slots, without any welds between the first and second bared surfaces.

As such, the design of the stator according to the invention allows for a putting into place of the first and second conductive segments in the slots by introducing them in the longitudinal direction of said slots. Introducing conductive segments in the longitudinal direction makes it possible to retain tooth roots of optimum dimensions that favour the electromagnetic exchange between the stator and the rotor. Moreover, the first and second segments come into contact and constitute a continuous wire, simply by putting them in position in the slots, which avoids any deformation of said conductive segments after the setting in place thereof. The means for maintaining furthermore suppress any weld between the conductive segments in order to ensure the continuity of the winding.

These means for maintaining are arranged directly in the slots, which makes it possible to optimise the pressure exerted by the latter on the contact surfaces between the first and second bared surfaces. Furthermore, this arrangement of the means for maintaining have no impact on the encumbrance and the arrangement of the buns, or furthermore on all of the elements of the stator arranged outside of the slots of the single-block body. This has for advantage, in particular, to leave complete freedom for the setting in place of the connection elements as a star or as a triangle between the phases and for the setting in place of the phase outputs to which will be connected, for example, the diode bridge making it possible to rectify the current.

According to the rotary electric machine stator object of the invention, the first branches and the second branches each comprise a section with a transversal cross-section with a rectangular shape. The corners of the rectangle will preferably be slightly rounded in order to guarantee a homogenous deposition of insulation over the entire periphery of the conductive segments. Introducing first and second branches in the longitudinal direction, inside the slots, makes it possible to overcome the presence of tooth roots and favours the implementation of a rectangular section inside the slots, which makes it possible to optimise the dimensions of the tooth roots and the filling rate of the slots. This contributes to improving the electromagnetic exchange between the rotor and the stator and, the output of the rotary electric machine.

According to a preferred design of the rotary electric machine stator object of the invention, the first and second bared surfaces are arranged opposite and in contact in the radial direction with respect to one another, inside the slot. These bared surfaces extend over a length that corresponds to the length of the slot. It could however be provided, in an alternative design, to have these first and second bared surfaces opposite and in contact in the direction of the circumference with respect to another.

In a first embodiment, according to this aforementioned preferred method of design of the rotary electric machine stator, the first and second branches have a parallelepiped shape, of rectangular section, provided with a bevel. These bevels are arranged opposite on the first and second branches. Furthermore, the first and second bared surfaces are arranged on the bevelled faces opposite. According to this first embodiment, the section of the windings in the buns is identical to the section of the windings in the slots.

Preferably, according to this first embodiment, the bevels comprise an angle with a maximum value equal to 5 degrees. This allows for a self-blocking between the first and second bared surfaces when a pressure is exerted on the first and second branches in order to maintain said bared surfaces in contact.

In a second embodiment, according to this aforementioned preferred method of design of the rotary electric machine stator, the first and second branches have a parallelepiped shape, of rectangular section, provided with a chamfer. These chamfers are arranged opposite on the first and second branches. Furthermore, the first and second bared surfaces are arranged on the chamfered faces opposite. This makes it possible to reduce the section of the winding in the two buns constituted respectively of the first connector heads of the first conductive segments and of the second connector heads of the second conductive segments, with respect to the section of the winding in the slots. As such, this second embodiment makes it possible to reduce the quantity of material used for the manufacture of the windings of the coil. This contributes to reducing the consumption of raw material, in particular copper, during the manufacture of the stator. Furthermore, the reduction in the quantity of material of the windings in the buns favours a better cooling of the coil by ventilation.

Preferably, according to this second embodiment, the chamfers comprise an angle with a maximum value equal to 5 degrees. This allows for a self-blocking between the first and second bared surfaces when a pressure is exerted on the first and second branches in order to maintain said bared surfaces in contact.

In a third embodiment, according to this aforementioned preferred method of design of the rotary electric machine stator, the first and second branches have a parallelepiped shape, with rectangular section. The bared first and second surfaces are furthermore arranged on the longitudinal faces opposite these first and second branches. This third embodiment makes it possible to divide by two the section of the windings in the buns with respect to the section of the windings in the slots, and therefore procure the same advantages as the second embodiment.

According to these aforementioned embodiments, it is possible to arrange means for anchoring between the first and second bared surfaces. These means for anchoring are configured to block the relative movements between the first and second adjacent branches in the longitudinal direction of the slot, which makes it possible to maintain said surfaces in contact with one another.

According to these different embodiments, the means for maintaining are constituted of pressure shims arranged respectively in each slot and configured to exert a force in the radial direction, against the first and second branches arranged in each one of said slots. Alternative designs for the means for maintaining could however be provided. For example, these means for maintaining could be configured to block any translation of the first and second branches in the longitudinal direction of the slots, in such a way as to maintain the first and second bared surfaces in contact respectively against one another in the slots. A tight mounting of the first and second branches in contact with one another, inside the slots, can also be provided.

According to a preferred design of the rotary electric machine stator object of the invention, the first and second conductive segments each have a plunger between the first branches thereof, respectively between the second branches thereof. This plunger favours the setting in place of the first and second branches which are in succession on the same layer in the slots, circumferentially on the body of the stator.

According to the rotary electric machine stator object of the invention, each winding of the coil comprises a phase input conductive segment which comprises an input branch coated with insulation except the presence of a bared input surface. This input branch is engaged in a slot, with the bared input surface coming into contact with the second bared surface opposite a second conductive segment at the beginning of the phase. Furthermore, the means for maintaining are configured to maintain the bared input surface and the second bared surface in contact with one another. This design also facilitates the implementation of the windings of the coil and furthermore offers a high degree of freedom for positioning phase inputs to which the diode current rectifier bridge is connected. Each input conductive segment further comprises a connection branch that extends the input branch towards the exterior of the bun, with this connection branch being configured to be connected to said diode current rectifier bridge.

According to the rotary electric machine stator object of the invention, the latter comprises at least one conductive connection segment that comprises connection branches. This conductive connection segment is coated with insulation, except the connection branches which each comprise a bared connection surface, with the bared connection surfaces coming into contact with the second bared surfaces of second conductive segments at the end of phases even possible at the beginning of the phases according to the type of connection provided, for example as a star or as a triangle in the case of a three-phase coil. Furthermore, the means for maintaining are configured to maintain said bared connection surfaces and said second bared surfaces in contact with one another. This conductive connection segment makes it possible to carry out a connection between the phases of the coil.

Preferentially, the first connector heads of the first conductive segments and the second connector heads of the second conductive segments each have a shape of a V. Preferably, this V shape has an angle at the vertex that is slightly truncated.

The invention also relates to the method for manufacturing a rotary electric machine stator that has the aforementioned characteristics. This method consists at least:
in inserting the first branches of the first conductive segments in a first longitudinal direction of the body, inside the slots;
in inserting the second branches of the second conductive segments in a second longitudinal direction of the body, inside the slots;
in positioning in contact the first bared surfaces with the respective second bared surfaces, arranged opposite inside the slots;
in setting in place the means for maintaining making it possible to maintain said first and second bared surfaces in contact with one another, inside the slots.

The inserting of the first branches and the inserting of the second branches in the slots can be carried out in conjunction or in two separate steps. Furthermore, the first branches are preferably all inserted at the same time into the slot. The same applies for the second branches.

As such the method of manufacturing avoids any stress on the first and second conductive segments during the putting into place thereof in the slots, which makes it possible to minimise the thickness of the slot insulation. The filling rate of the slots is as such optimised. The duration for constituting the coil is furthermore substantially reduced since the first conductive segments and the second conductive segments can be prepared upstream of the assembly step in the slots of the body of the stator. Moreover, the setting in place of the first and second conductive segments opposite and over the entire periphery of the stator can be carried out in a single step and without any constraint and welding operation between the first and second conductive segments. This makes it possible to optimise the manufacturing time of the coil and avoids the carrying out of expensive welds and the producing of waste.

Furthermore, the inserting of the first and second branches in the longitudinal direction of the slots makes it possible to retain a tooth root of optimum width, which favours the electromagnetic exchange between the stator and the rotor of the rotary electric machine.

According to the method for manufacturing the rotary electric machine stator, the first and second conductive segments are each carried out beforehand by:
constituting a pin in a sheet or plate of conductive material, preferably by stamping or by laser or water jet cutting;
coating the pin with insulation;
baring the branches of the pin in the zones that correspond to the bared surfaces, for example by machining or rectification, in such a way as to remove the insulation on said surfaces;
folding the pin in order to give it the shape of a U with the two branches thereof.

Prior to the step of coating the pin with insulation, the latter can undergo a step of forming a bevel or a chamfer when it entails conductive segments according to the first embodiment or the second embodiment, such as mentioned hereinabove. In certain cases, a sheet of material that is rolled can also be provided in order to form in the two lateral portions thereof chamfers or bevels, with said sheet then being stamped in order to constitute pins.

Preferably, during the step of folding the pin, a plunger is carried out between the branches of the conductive segment.

The invention also relates to a rotary electric machine of the motor or generator type that comprises such a stator object of the invention.

The characteristics and advantages of this invention shall appear when reading the non-limiting embodiments that are based on figures, among which:

In the rest of the description, the same references will be used to define the same elements on a part and/or on various alternative embodiments of the stator object of the invention.

FIG. 1 shows a stator 1 of an electric rotary machine (not shown) that can consist of a motor or a generator. In an application, the stator 1 is intended for implementing an alternator or a starter-alternator for a motor vehicle.

Figure 6A:
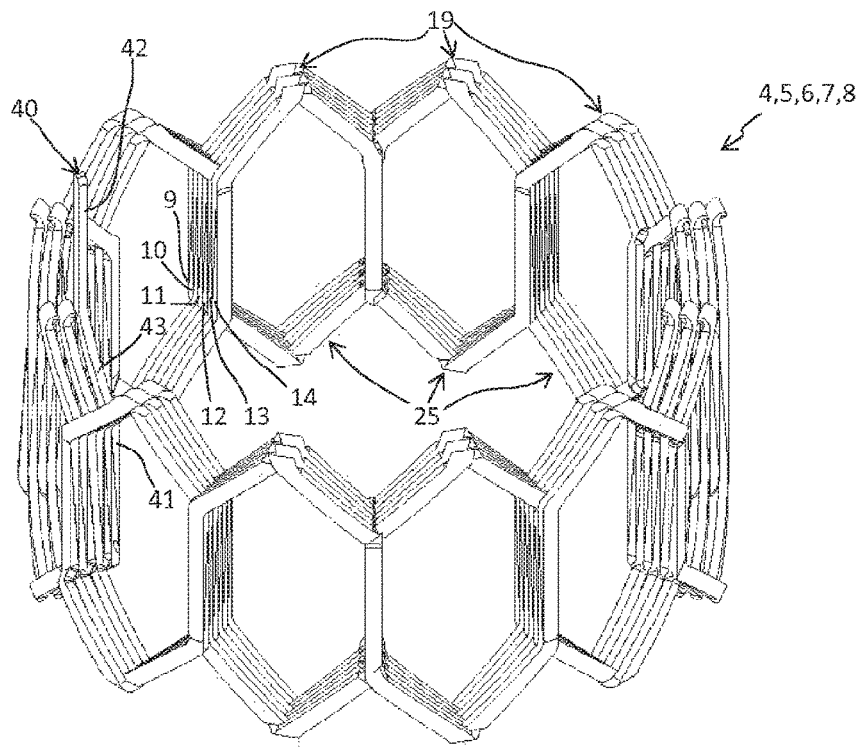
FIGS. 6A and 6B show a coil phase constituted of a winding on six layers and the conveying of this phase on six layers, such as this phase appears normally when the first and second conductive segments are positioned and connected together in the slots of the body of the stator.

This stator 1 comprises a body 2 and a coil 3. In this FIG. 1, the coil 3 comprises five phases 4, 5, 6, 7, 8 each constituted of a single winding on six layers 9, 10, 11, 12, 13, 14 shown in more detail in FIGS. 6A and 6B. Of course, the number of phases can be modified; a three-phase coil can for example be provided, with each phase constituted of a single winding. The number of windings per phase can also be modified; for example two windings per phase can be provided. The number of layers of each winding can also be modified.

Figure 2:
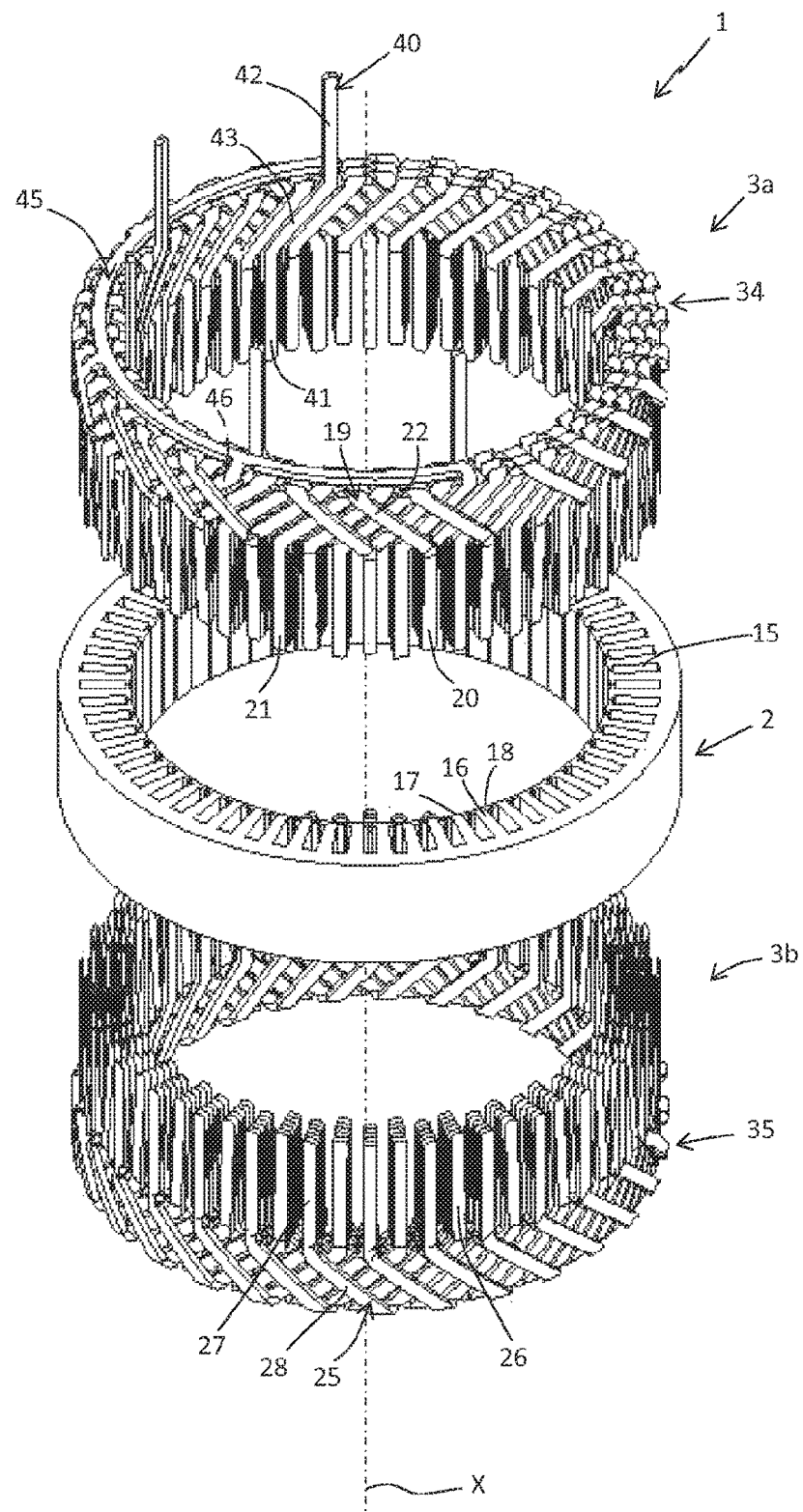
FIG. 2 shows an exploded view of FIG. 1.
Figure 3:
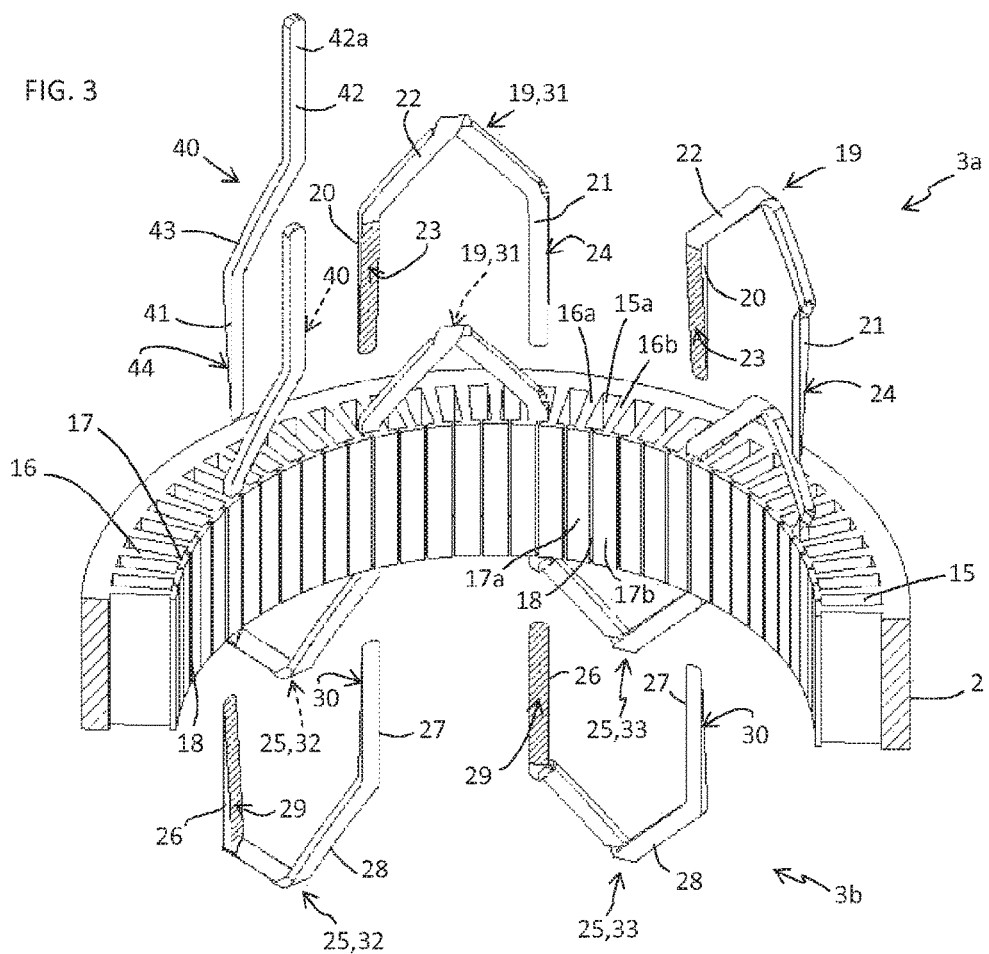
FIG. 3 shows a three-dimensional view as a cross-section of the body of the stator and reveals the insertion of first and of second conductive segments of a phase portion into slots.

In the FIGS. 2 and 3, note that the body 2 comprises slots 15 which are arranged in the longitudinal direction parallel to the X axis of the stator 1. This axis X corresponds to the axis of rotation of the rotor (not shown) of the rotary electric machine. Furthermore, the slots 15 extend radially and circumferentially, with a spacing between them, around the body 2. These slots 15 are separated from one another by teeth 16, which each tooth 16 comprising at its end a tooth root 17 which extend circumferentially on either side of the tooth 16. As such, such as shown in FIG. 3, two tooth roots 17a, 17b of two adjacent teeth 16a, 16b make it possible to close practically entirely a slot 15a, with only a small longitudinal slot 18 keeping this slot 15a open. The same applies for all of the slots 15.

Figure 4:
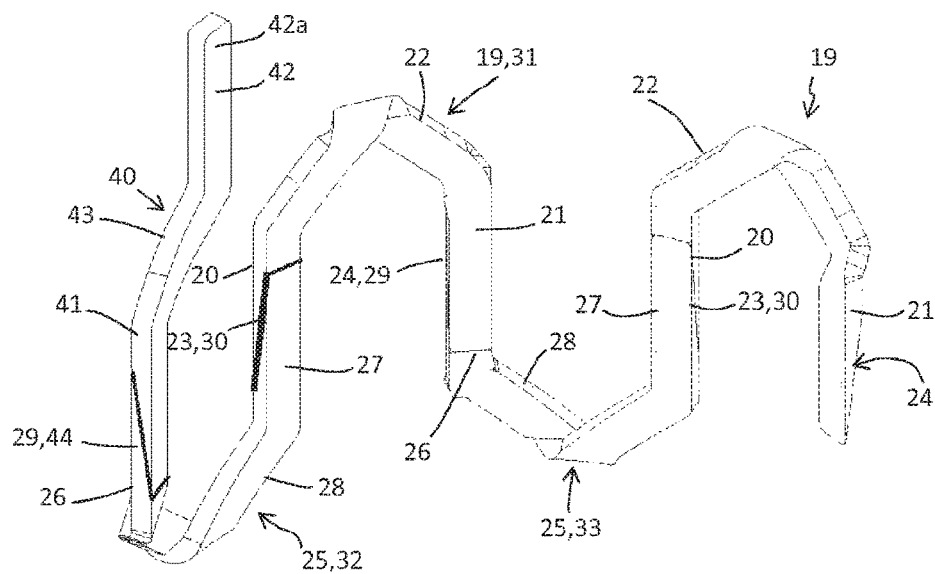
FIG. 4 shows a phase portion constituted of first and second conductive segments in contact.

With regards to FIGS. 2, 3 and 4, in particular, note that the coil 3 comprises a first portion 3a and a second portion 3b arranged respectively on the two longitudinal sides of the body 2.

The first portion 3a of the coil 3 comprises first conductive segments 19, with each first conductive segment 19 comprising two first branches 20, 21 connected together by a first connector head 22. These first conductive segments 19 are preferably made of copper and are coated with insulation 19a, preferably enamel, except for the two first branches 20, 21 which each comprise a first bared surface 23, 24, as shown in FIGS. 3, 4, 7 to 9, 19, 22 and 23.

Likewise, the second portion 3b of the coil 3 comprises second conductive segments 25, with each second conductive segment 25 comprising two second branches 26, 27 connected together by a second connector head 28. These second conductive segments 25 are also made of copper and coated with insulation 25a, except for the two second branches which each comprise a second bared surface 29, 30, as shown in FIGS. 3, 4, 7 to 9, 19, 22 and 23.

The first conductive segments 19 and the second conductive segments 25 are arranged opposite and in a staggered configuration on each side of the body 2. Such as shown in FIG. 3 as drawn lines and in FIG. 4, during the insertion of the first branches 20, 21 and of the second branches 26, 27 inside the slots 15, the first bared surface 23 of a first branch 20 of a first conductive segment 31 comes into contact with the second bared surface 30 of a second branch 27 of a second conductive segment 32. Likewise, the first bared surface 24 of the other first branch 21 of this first conductive segment 31 comes into contact with the second bared surface 29 of the second branch 26 of the second conductive segment 33 according to the second conductive segment 32. The same operation is carried out between all of the first and second conductive segments 19, 25, for each turn of each one of the windings 4, 5, 6, 7, 8. This operation remains the same regardless of the number of phases of the coil; the representation in FIG. 3 corresponds to a six-phase coil while that of FIG. 2 corresponds to a five-phase coil, by way of example.

Figure 6B:
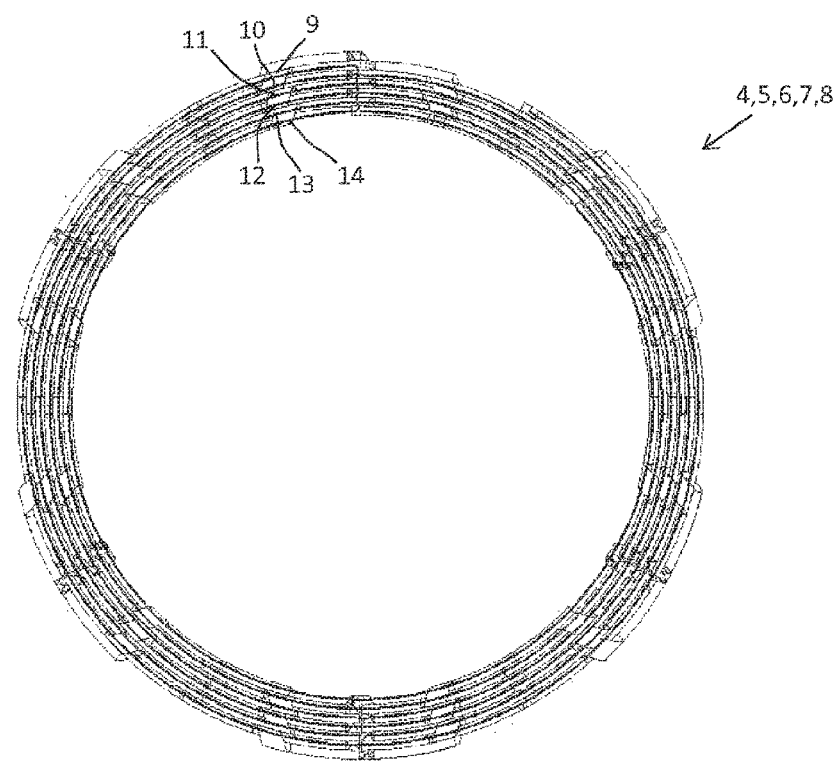

It is noted in FIG. 6B that, for each winding 4, 5, 6, 7, 8 diagrammed with a solid line, the turns arranged over six layers 9, 10, 11, 12, 13, 14 are wound in the reverse direction one after the other around the body 2 of the stator 1.

Advantageously, all of the first branches 20, 21 and all of the second branches 26, 27 are inserted in conjunction inside the slots 15, which allows for time to be saved during the assembly. Two separate steps can however be provided in order to insert into the body 2, firstly the first conductive segments 19 then the second conductive segments 25.

Figure 1:
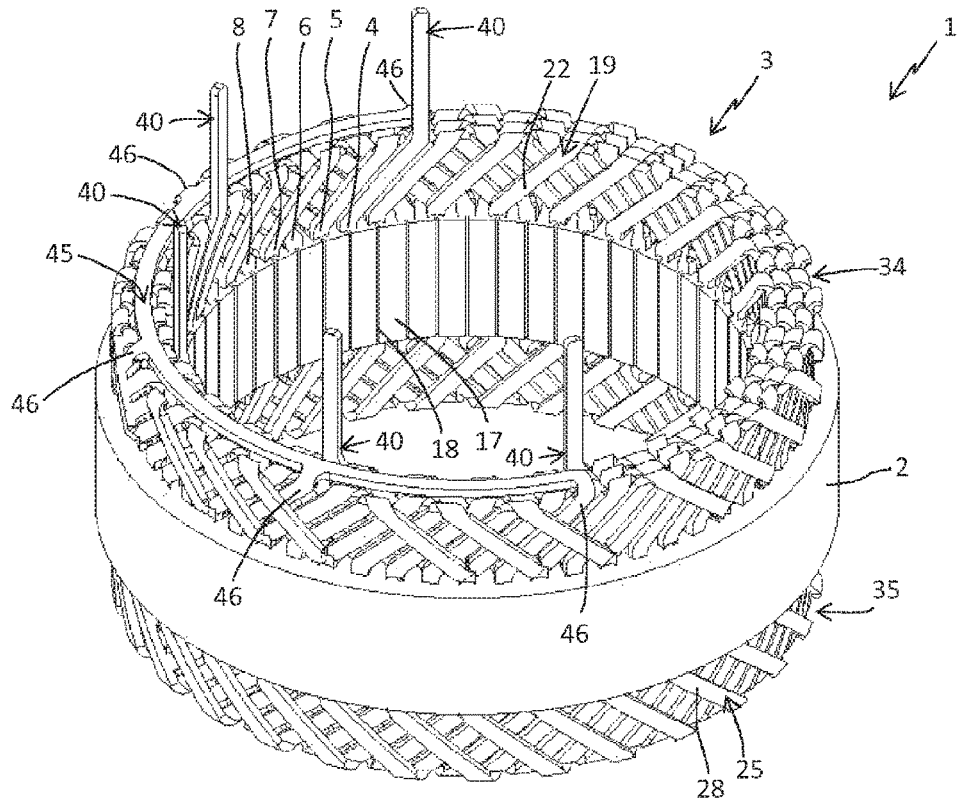
FIG. 1 shows a three-dimensional view of a rotary electric machine stator that comprises a coil with five phases connected as a star.
Figure 20:
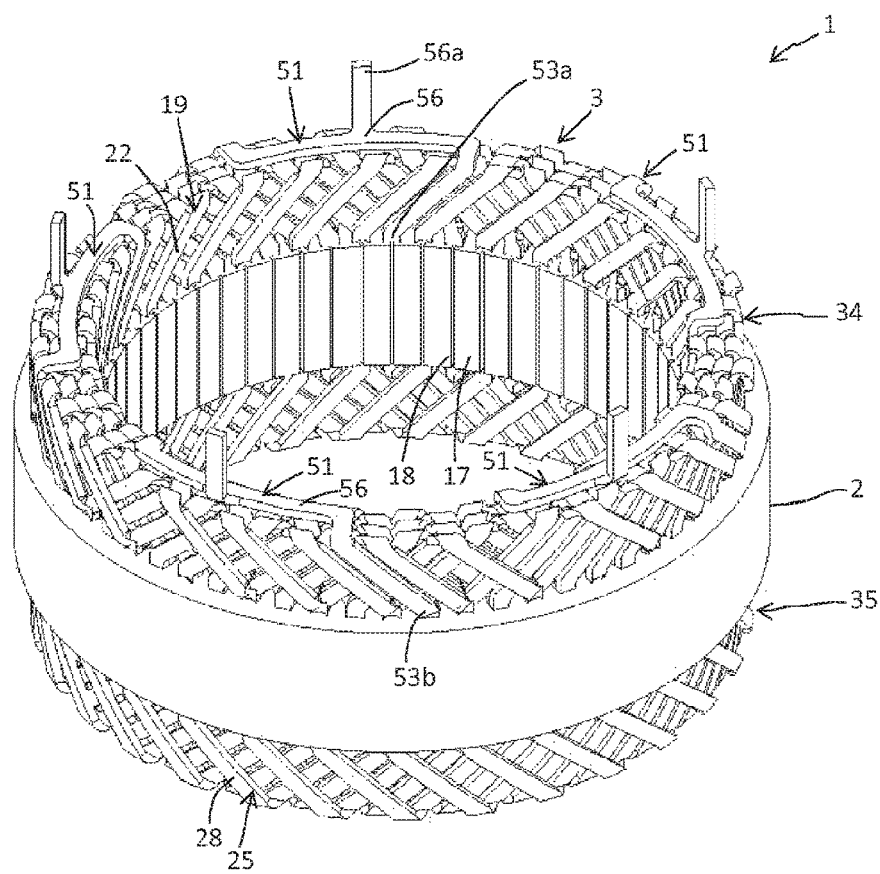
FIG. 20 shows a stator alternative with a connection of five phases as a pentagon and FIG. 21 shows one of the connection segments that allows for the implementing of said stator of FIG. 20.

When the coil 3 is formed, the first connector heads 22 of the first conductive segments 19 form a first bun 34 on one side of the body 2 and, the second connector heads 28 of the second conductive segments 25 form a second bun 35 on the other side of the body 2, as shown in FIGS. 1, 2 and 20.

Such as shown in FIGS. 1 to 3 and 20, when the first and second conductive segments 19, 25 are inserted into the body 2, the tooth roots 17 prevent the release of the first branches 20, 21 and of the second branches 26, 27 outside of the slots 15, in the radial direction.

Figure 7:
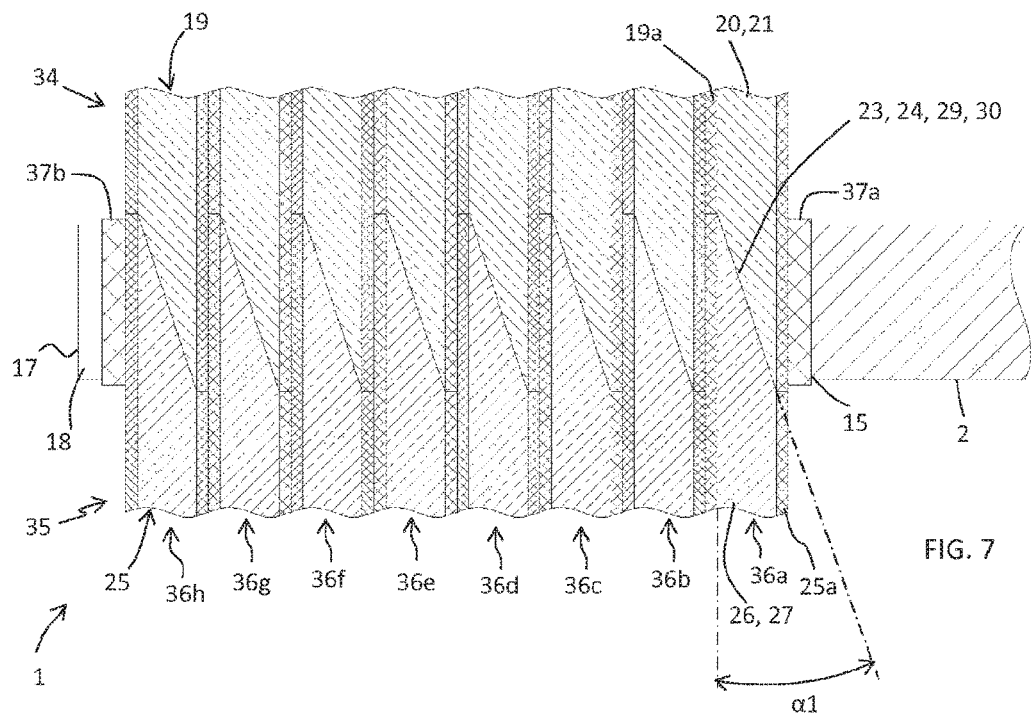
FIGS. 7, 8 and 9 show as a cross-section three alternatives for implementing bared surfaces on the first and second branches of the first and second conductive segments.
Figure 8:
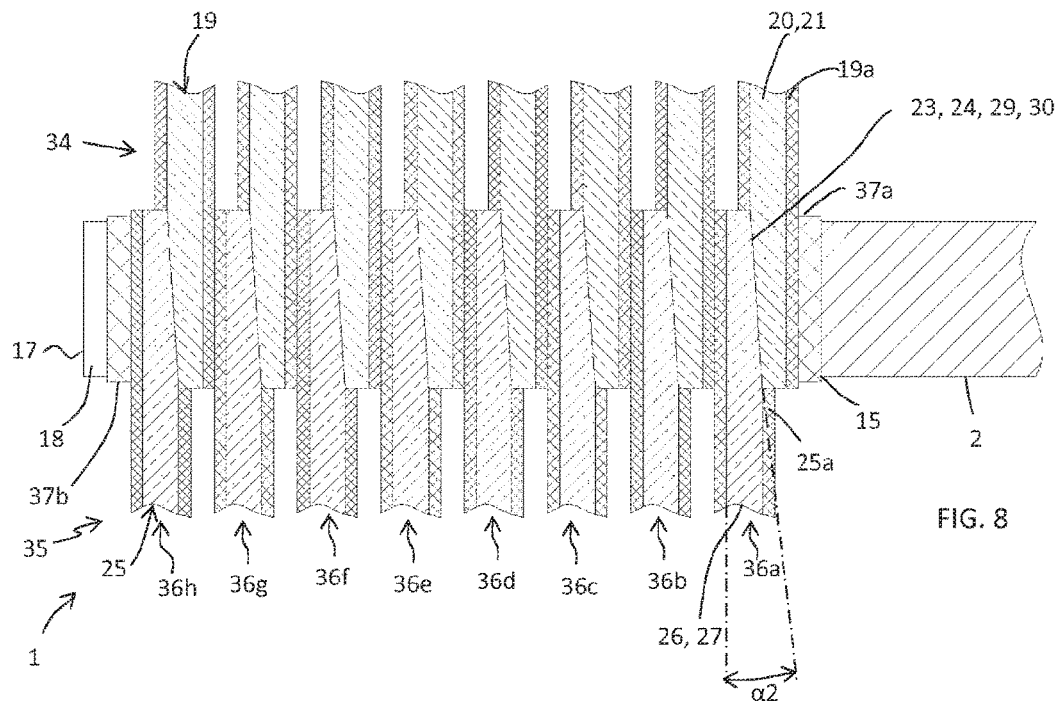
Figure 9:
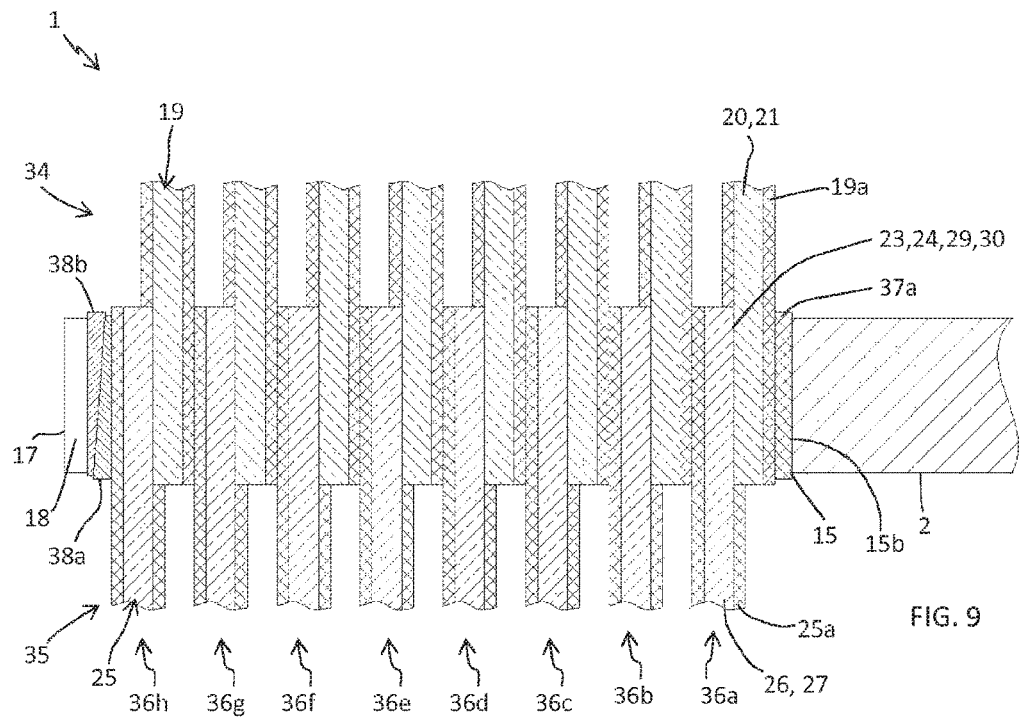

FIGS. 7 to 9 show different realisations of the first bared surfaces 23, 24 and second bared surfaces 29, 30 respectively on the first branches 20, 21 and on the second branches 26, 27.

In FIG. 7, the first bared surfaces 23, 24 and the second bared surfaces 29, 30 complement one another and are bevelled. This bevelled shape also appears in FIGS. 2 to 4. Such as shown in FIG. 7, the bevelled face is inclined by an angle α1. This angle α1 is preferably less than 5 degrees, which allows for a self-blocking between the first bared surfaces 23, 24 and the second bared surfaces 29, 30 in contact when a pressure is exerted in the radial direction on the first branches 19 and second branches 25.

In this FIG. 7, the winding comprises eight layers 36a, 36b, 36c, 36d, 36e, 36f, 36g, 36h arranged in the slot 15. Furthermore, the presence is noted of a slot insulation 37a, 37b arranged on each side of the layers 36a, 36b, 36c, 36d, 36e, 36f, 36g, 36h inside the slot 15. The layers 36a, 36b, 36c, 36d, 36e, 36f, 36g, 36h are mounted tight in the slot 15 in such a way as to exert a pressure against these layers. The combination of the pressure exerted and of the angle α1 less than 5 degrees makes it possible to maintain the first conductive segments 19 in contact with the second conductive segments 25.

Of course, an angle α1 greater than 5 degrees and different means for maintaining configured to block the translation of the first conductive segments 19 and of the second conductive segments in the direction of the X axis could be provided. By way of example, it is noted in FIG. 19 that the bevelled faces include a barbed shape 39 which allows for an anchoring between the first branch 20, 21 and the second branch 26, 27 in the longitudinal direction of the slot 15.

Figure 19:
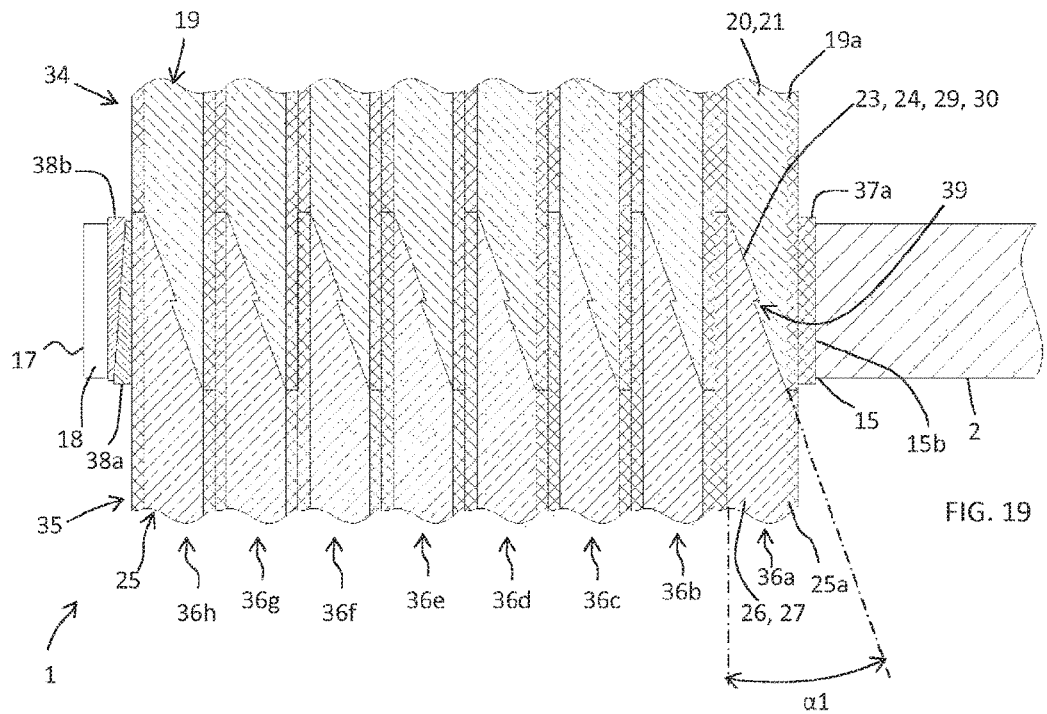
FIG. 19 shows means of anchoring between the first branches and the second branches of the first and second conductive segments.

It is noted in FIG. 19 that a slot insulation 37a is arranged in the bottom 15b of the slot 15, while two pressure shims 38a, 38b, of bevelled shape, are arranged on the side of the tooth roots 17 and make it possible to exert a pressure against the layers 36a, 36b, 36c, 36d, 36e, 36f, 36g, 36h inside the slot 15. The position of the pressure shims could be inversed 38a, 38b and the position of the slot insulation 37a in this slot 15.

More preferably, the length of the first and second bared bevelled surfaces 23, 24, 29, 30 is at least equal to the length of the slot 15, as shown in FIG. 7.

It is noted in FIG. 7 that the winding sections of the two buns 34, 35 are identical to the winding section in the slot 15.

In FIG. 8, there are characteristics identical to those of FIG. 7, except that the bevelled shape of the first bared surfaces 23, 24 and of the second bared surfaces 29, 30 is replaced with a chamfer inclined by an angle α2. This angle α2 is preferably less than 5 degrees in order to allow for a self-blocking between the first branches 20, 21 and the second branches 26, 27 under the action of the pressure exerted by their tight mounting inside the slots 15. An angle α2 greater than 5 degrees and a barb 39 could also be provided, as for the bevelled faces of FIG. 19. Other means of maintaining in contact could also be considered. The various alternatives of the pressure means on the layers 36a, 36b, 36c, 36d, 36e, 36f, 36g, 36h inside the slot 15, in particular the pressure shims 38a, 38b shown in FIG. 19, can be implemented for this embodiment of FIG. 8.

Moreover, the bared surfaces 23, 24, 29, 30 extend over a length that corresponds at least to the length of the slot 15, such as illustrated in FIG. 8. It is noted in FIG. 8 that the winding sections of the two buns 34, 35 are less than the winding section in the slot 15 due to the presence of chamfers that extend at least over the length of the slot 15.

In FIG. 9, there are characteristics identical to those of FIGS. 7 and 8, except that the bevelled shape or the chamfered shape is suppressed. The first branches 20, 21 and the second branches 26, 27 have the shape of a parallelepiped, i.e. the section, viewed in a transversal cross-section plane, is constant over the entire length of said branches. Furthermore, the first bared surfaces 23, 24 and the second bared surfaces 29, 30 are directly implemented on the adjacent faces opposite the first branches 20, 21 and second branches 26, 27. This corresponds to the embodiment of FIG. 8, with an angle α2 of zero.

It is noted in FIG. 9 the presence of a slot insulation 37a in the bottom 15b of the slot 15 and of a set of pressure shims 38a, 38b on the side of the tooth roots 17, as for FIG. 19. Other alternatives of means for pressure can also be implemented such as described hereinabove. A barb 39 could also be provided, as in FIG. 19.

As for FIGS. 7 and 8, it is noted in FIG. 9 that the first and second bared surfaces extend at least over the length of the slot 15. It is noted in FIG. 9 that the winding sections of the two buns 34, 35 are equal to half of the winding section in the slot 15. This facilitates the cooling of the buns 34, 35 and furthermore makes it possible to reduce the quantity of material of the coil 3 in these buns 34, 35. The same applies for FIG. 8.

Of course, other complimentary shapes of first bared surfaces and of second bared surfaces could also be considered. It is simply suitable to provide means for maintaining said bared surfaces in contact, adapted to prevent the translation of the first conductive segments 19 and of the second conductive segments 25 in the longitudinal direction of the slots 15.

Figure 22:
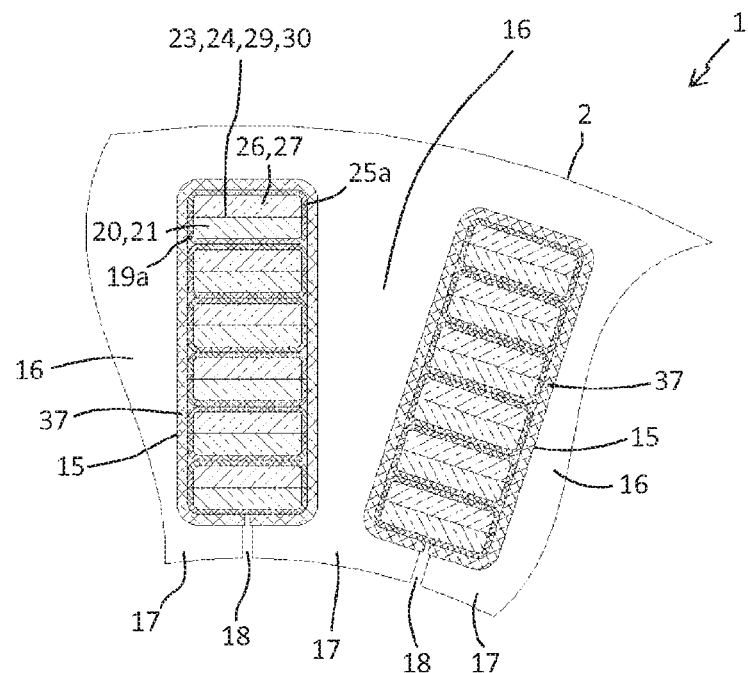
FIGS. 22 and 23 show two partial views as a transversal cross-section of a stator body according to the invention, revealing two different transversal sections of the slots and of the branches of the conductive segments.

Such as shown in FIG. 22, the first branches 20, 21 and the second branches 26, 27 have a rectangular form in a transversal cross-section plane. The same applies for the slots 15. In an alternative shown in FIG. 23, the first branches 20, 21 and the second branches 26, 27 have a trapezoidal shape in a transversal cross-section plane. The same applies for slots 15. This can be considered for the three alternative embodiments shown in FIGS. 7 to 9 and described hereinabove, even for any other alternative embodiment. It is noted in these FIGS. 22 and 23, that the slots 15 are coated with a slot insulation 37.

In FIGS. 1 to 4 and 6A, it is noted that each winding 4, 5, 6, 7, 8 comprises a phase input conductive segment 40 which comprises an input branch 41 extended upwards by a connection branch 42, the input branch 41 and the connection branch are connected together by a connecting portion 43. The phase input conductive segment 40 is coated with insulation except that the input branch 41 comprises a bared input surface 44 and that the end 42a of the connection branch 42 is adapted, for example bared, in order to be able to be connected to a diode current rectifier bridge (not shown). Of course, the shape of the connection branch 42 and the means for connecting this connective branch 42 will be adapted according to the configuration of the diode bridge (not shown).

The bared input surface 44 is of a design identical to the first bared surfaces 23, 24 on the first branches 20, 21 of the first conductive segments 19. This bared input surface 44 comes into contact with the second bared surface 29 opposite a second conductive segment 25, 32 arranged at the beginning of the phase, as shown in particular in FIGS. 3 and 4.

Note in FIGS. 1 to 4 and 6A that the connecting portion 43 has a shape identical to that of the first portion of the first connector heads 22 on the first conductive segments 19, in such a way as to integrate perfectly into the first bun 34, in a way identical to said first connector heads 22.

The pressure shims 38a, 38b shown in FIGS. 9 and 19, and even all other suitable means for maintaining, make it possible to maintain the bared input surface 44 of the input branch 41 in contact with the second input surface 29 of the second conductive segment 25, 32 of the beginning of the phase. A barb 39 can possibly be provided as shown in FIG. 19.

Figure 10:
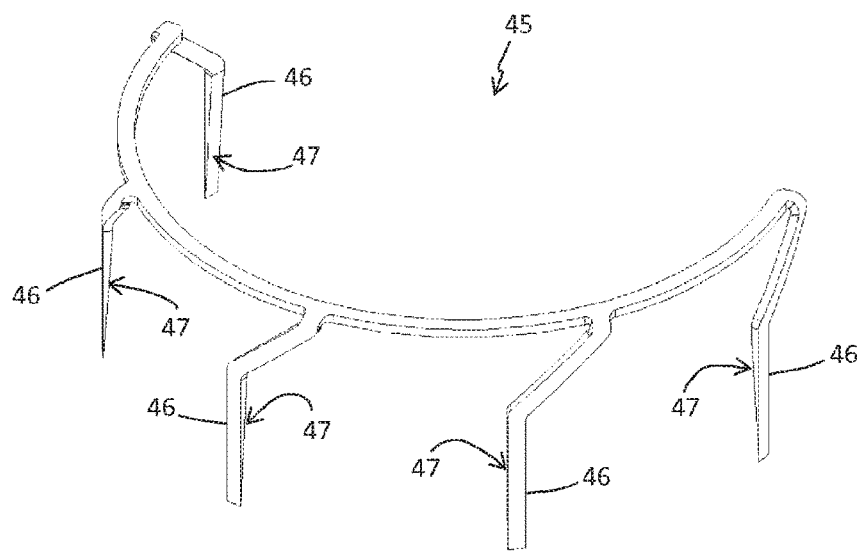
FIG. 10 shows a segment for connecting five phases as a star allowing for the implementation of the stator of FIG. 1.
Figure 11:
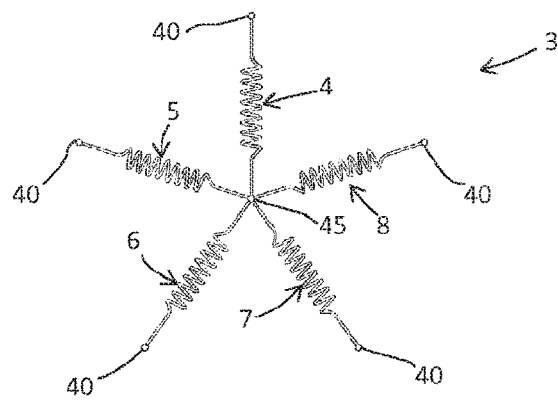
FIGS. 11 to 14 show possible connection alternatives for a three-phase coil and for a five-phase coil.

Such as shown in FIGS. 1, 2 and 10, the stator 1 comprises a conductive connection segment 45. This conductive connection segment 45 comprises connection branches 46, five in the case wherein said conductive connection segment 45 allows for a connection as a star between the five phases 4, 5, 6, 7, 8 of the coil 3, such as is diagrammed in FIG. 11.

This conductive connection segment 45 is coated with insulation except the connection branches 46 which each include a bared connection surface 47. These bared connection surfaces 47 come into contact with the second bared surfaces 30 of five second conductive segments 25 arranged at the end of the phases.

The pressure shims 38*a*, 38*b* shown in FIGS. 9 and 19, and even all other means of maintaining, also make it possible to maintain the bared connection surfaces 47 and the second bared surfaces 30 in contact with one another, with their shapes being complementary. A barb 39 can possibly be provided as shown in FIG. 19.

Figure 12:
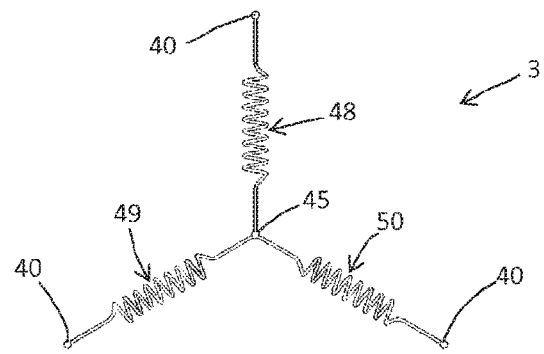

Different configurations of the conductive connection segment 45 can be considered according to the number of phases present on the coil 3. When the coil 3 is three-phase, as each phase 48, 49, 50 is constituted for a single winding, the conductive connection segment will be of a sign similar to that of the connection segment 45 of FIG. 10, with however only three connection branches 46, which will make it possible to design a three-phase connection as a star, such as is diagrammed in FIG. 12.

Figure 13:
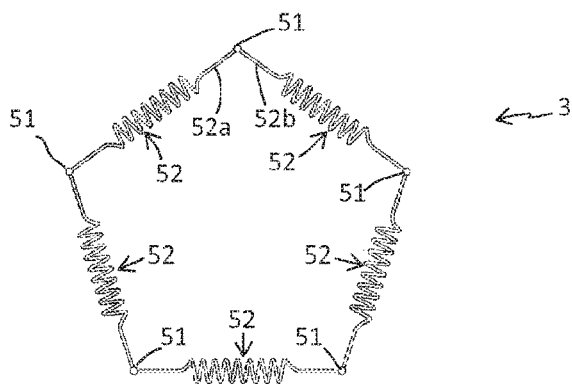
Figure 14:
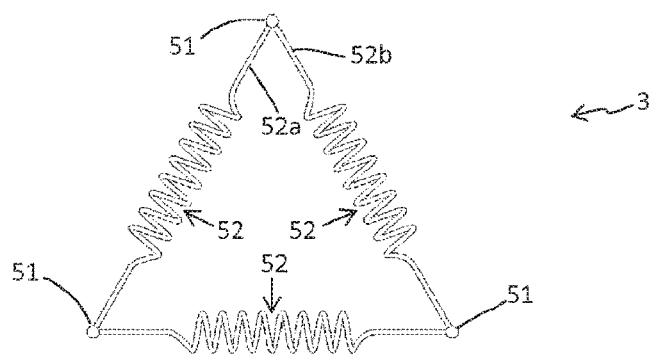

Such as diagrammed in FIGS. 13 and 14, alternatives of the conductive connecting segments 51 between the phases 52 of a coil 3 can also be provided. This conductive connection segment 51 would for example be configured to connect the phases 52 by forming a pentagon when said coil 3 has five phases 52, such as diagrammed in FIG. 13. Even as a triangle when this coil 3 has three phases 52, such as diagrammed in FIG. 14.

Figure 21:
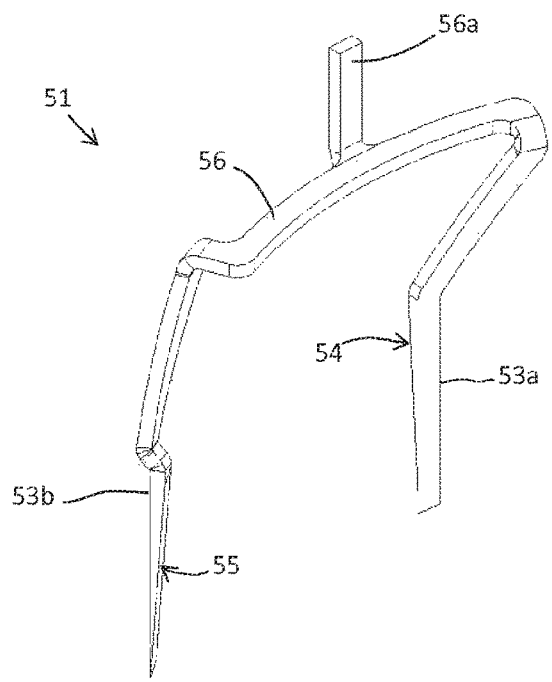

FIGS. 13, 20 and 21 correspond to an alternative of a stator 1 that comprises five phases 52 each comprised of a single winding, with the five phases 52 being connected together to form a pentagon by means of five connection segments 51. Each connection segment 51 comprises a first connection branch 53*a* provided with a bared connection surface 54 which comes into contact with the second bared surface 29 of a second branch 26 of the second conductive segment 25 arranged at the end of a first phase 52*a*. Likewise, this connection segment 51 comprises a second connection branch 53*b* provided with a bared connection surface 55 that comes into contact with the second bared surface 30 of a second branch 27 of the second conductive segment 25 arranged at the beginning of a second phase 52*b* that has to be connected to the preceding phase.

Such as shown in FIG. 20, this alternative conductive connection segment 51 also comprises a connection branch 56 that extends outside of the first bun 34, with the end 56*a* of this connection branch 56 being suited, for example bared, in order to allow for the connection thereof to a diode rectifier bridge.

Of course the rest of the conductive connection segment 51 is coated with insulation, as for the other conductive segments described hereinabove.

The pressure shims 38*a*, 38*b* shown in FIGS. 9 and 19, and even other means for maintaining, also make it possible to maintain the connection branches 54, 55 with the second branches 26, 27 of the second conductive segments 25 arranged at the end of the first phase and at the beginning of the second phase. A barb 39 can also be provided as shown in FIG. 19.

As can be noted in FIG. 4, for example, the first conductive segments 19 and the second conductive segments 25 are of comparable design. Their principle for implementation therefore remains identical. Therefore only a single method of implementation shall be described, with the second via analogy or transposition.

Figure 15C:
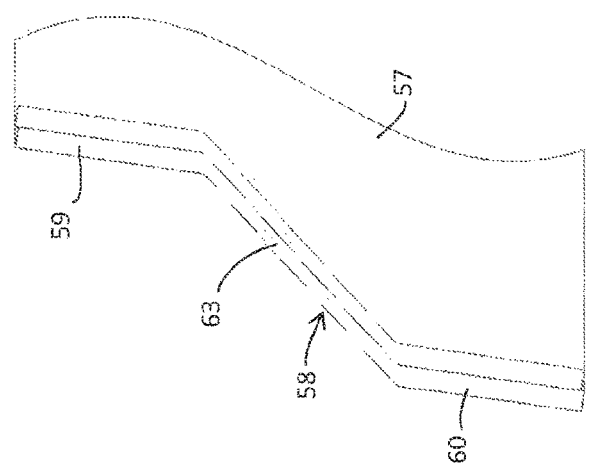
FIGS. 15A to 15C show three alternatives of the step of stamping during the implementation if the pin and, the FIGS. 16 to 18 show different steps of implementing first or second conductive segments using the pin.
Figure 15B:
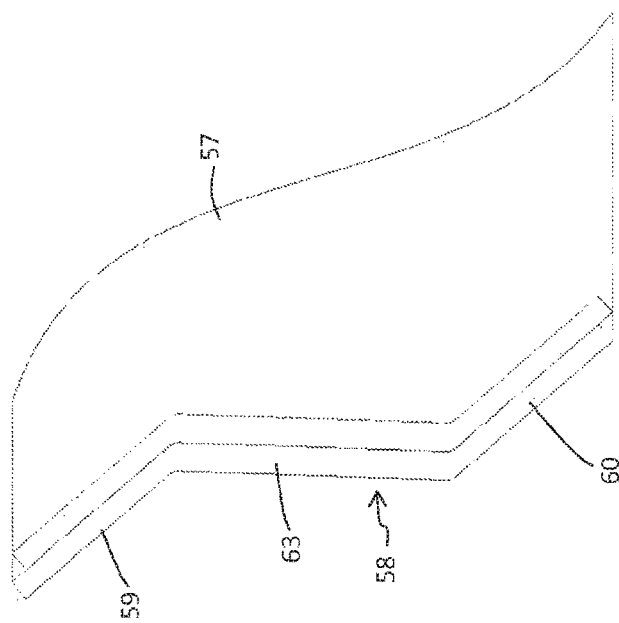
Figure 15A:
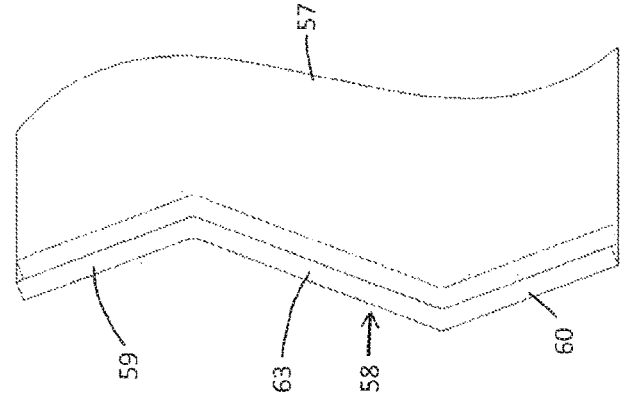

These first and second conductive segments 19, 25 come from a sheet or plate 57 of conductive material, more preferably copper, which is debited via stamping in the form of pins 58 that resemble a chicane, such as shown in FIGS. 15A to 15C. These FIGS. 15A to 15C show different methods of stamping pins, which make it possible to vary the sections of the pin 58 in the end portions thereof 59, 60 and in the central portion thereof 63, in particular in order to modify the section of the coil 3 in the first and second buns 34, 35. The operation of stamping advantageously makes it possible to implement pins 58 of a very low thickness without drawing of the material. This also makes it possible to have a pin section 58 that is more substantial in the curvature zones of this pin 58 which will receive a plunger, in order to retain a constant section when the conductive segment 19, 25 is completed. Other embodiments of the pin can furthermore be considered; it is possible for example to replace the stamping with a laser cutting.

For a realisation of the stator 1 according to FIG. 7, with bevelled bared surfaces 23, 24, 29, 30, the pins 58 undergo a step of beveling of the end portions thereof 59, 60, for example via a rolling. In certain cases, these rollings can also be carried out directly on the sheet or plate 57, before the step of stamping. This is also valid for a realisation of the stator 1 according to FIG. 8, with chamfered bared surfaces 23, 24, 29, 30.

Figure 16:
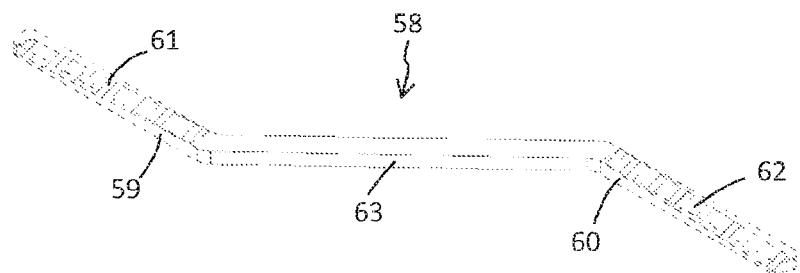

These pins 58 are then coated with insulation, preferably enamel, then the two end portions 59, 60 are bared, preferably by rectification or grinding, in such a way that each have a bared surface 61, 62, such as shown in FIG. 16.

Figure 17:
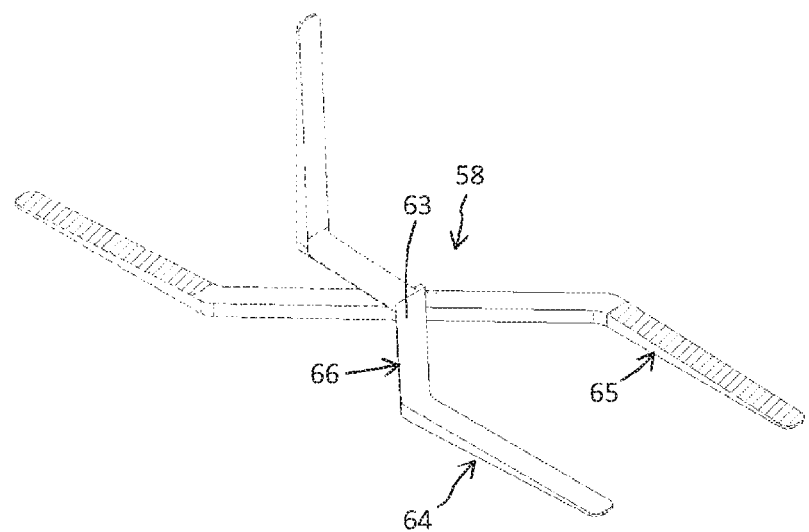

These pins 58 are then folded in the central portion 63 thereof, which allows for the formation of a U that has two branches 64, 65 connected together by a connecting element 66, such as shown in FIG. 17, which constitutes a first connector head 22 in the case of a first conductive segment 19 and a second connector head 28 in the case of a second conductive segment 25. This connecting element 66 has the shape of a V with its truncated vertex.

The coating of enamel and the rectification of the end portions 59, 60 are more preferably carried out before the folding of said pins 57; it could however be carried out after this folding, which however would complicate the step of rectification.

Figure 5A:
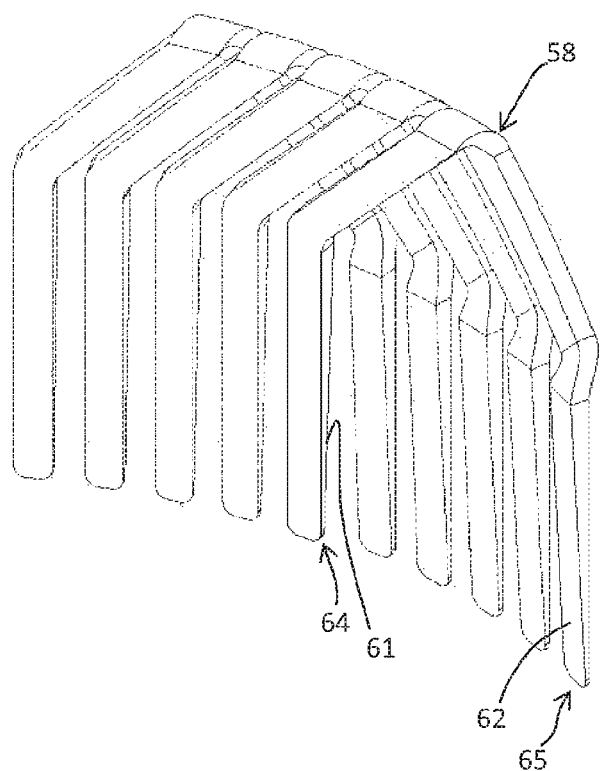
FIGS. 5A and 5B show five successive first conductive segments and reveal the circumferential alignment on the same layer, of the first branches.
Figure 5B:
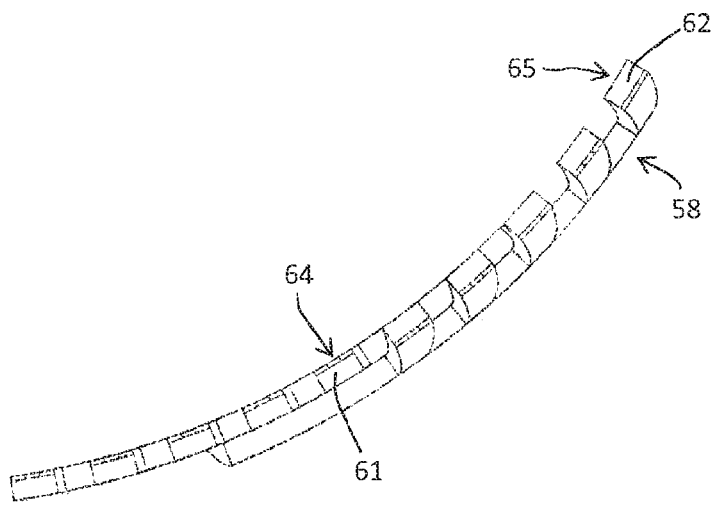
Figure 18:
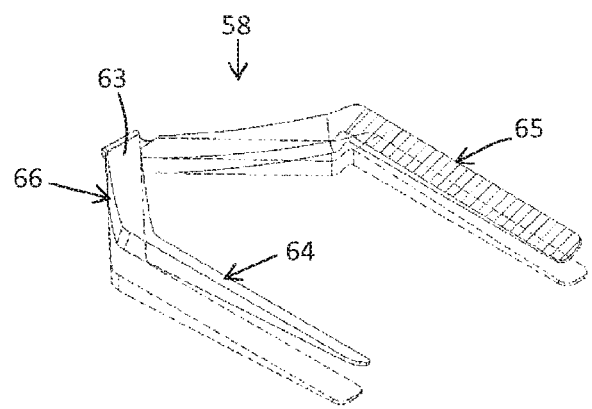

The pin 57 then undergoes a step of plunging of the branches 64, 65 such as shown in FIG. 18. Such a plunging makes it possible to nest one inside the other, by overlapping, the first conductive segments 19, or the second conductive segments 25, without modifying the thickness of the turns, as shown in FIGS. 5A and 5B. The same applies for the second conductive segments 25.

Other characteristics can be considered without leaving the scope of the invention. Alternative shapes for the first and second conductive segments can in particular be provided. Alternative shapes for the bared surfaces on the first branches 20, 21, the second branches 26, 27, the input branches 42 and the connection branches 46, 53*a*, 53*b* can also be provided. Alternative means for maintaining the contact of the first branches 20, 21 with the second branches 26, 27 can also be provided; likewise between the input branches 42 and the second branches 26 and between the connection branches 46, 53*a*, 53*b* and said second branches 26, 27. A finishing varnish or finishing glue can for example be provided in order to coat the body 2 and the coil 3, in such a way as to consolidate the maintaining in contact between the first and second conductive segments 19, 25.

Various types of polyphased coils by means of the invention can also be implemented. Each phase can furthermore be constituted of several windings, with each winding being carried out in the way described hereinabove. For example each phase can comprise two windings arranged by turns on several layers, next to one another in the slots 15.

Figure 23:
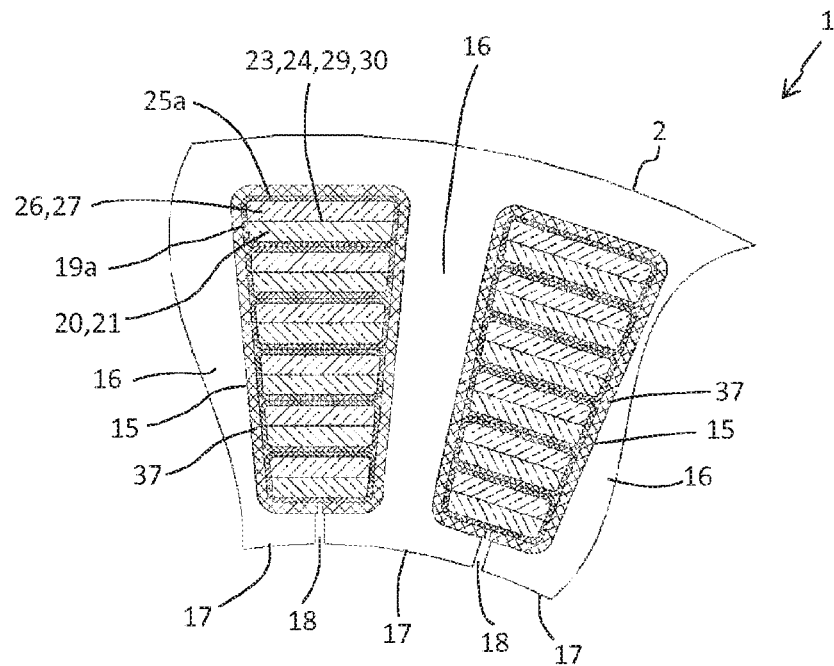

Alternative shapes for the slots 15 can also be provided, other than those shown in FIGS. 22 and 23.

The first and second buns 34, 35 of the coil 3 can be coated with an insulation varnish in such a way as to overcome any overruns of the first and second bared surfaces 23, 24, 29, 30 in said first and second buns 34, 35, which will make it possible to avoid any malfunction and to satisfy manufacturing standards.

The design of the stator 1 according to the invention makes it possible to design all of the components upstream, to pre-position all of the first conductive segments 19 and all of the second conductive segments 25 on each side of the body 2. This makes it possible to save time when mounting the stator 1.

This design of the stator 1 furthermore facilitates the recycling of the product since the coil 3 can easily be dismantled once the means for maintaining in contact of the first and second conductive segments 19, 25 are neutralised.

The stator 1 according to the invention will be implemented on rotary electric machines such as motors or generators. A particular application relates to the manufacturing of an alternator and of starter-alternators for automobiles. This stator design can also be used for wind turbine generators.

The invention claimed is:

1. A stator of a rotary electric machine comprising a body provided with slots that extend radially and circumferentially and, a polyphased coil constituted of several windings of turns arranged by layers in the slots, characterised in that each winding comprises, on the one hand, first conductive segments each provided with a first connector head extended by two first branches, with each first conductive segment being coated with insulation except the presence of a first bared surface on each one of the first branches and, on the other hand, second conductive segments each provided with a second connector head extended by two second branches, with each second conductive segment being coated with insulation except the presence of a second bared surface on each one of the second branches, with the shape of the first bared surface and the shape of the second bared surface being complementary, with the first conductive segments and the second conductive segments being arranged in a staggered configuration and in opposite directions successively one after the other, with each slot accepting first branches and second branches positioned opposite with the first bared surfaces thereof and the second bared surfaces thereof respectively in contact with one another in such a way as to form a continuous conductive wire, said stator comprising means for maintaining configured to maintain the first and second bared surfaces in contact with one another in the slots.

2. The stator according to claim 1, wherein the first branches and the second branches each include a transversal cross-section of rectangular shape.

3. The stator according to claim 2, wherein the first and second bared surfaces are arranged opposite and in contact in the radial direction in relation to one another, with said bared surfaces extending over a length that corresponds to at least the length of the slot.

4. The stator according to claim 3, wherein the first and second branches have a parallelepiped shape, with the first and second bared surfaces being arranged on the longitudinal faces opposite said branches.

5. The stator according to claim 3, wherein the first and second branches have a parallelepiped shape provided with a chamfer that has an angle of inclination, with the first and second bared surfaces being arranged on the chamfered faces opposite.

6. The stator according to claim 3, wherein the first and second branches have a parallelepiped shape provided with a bevel that has an angle of inclination, with the first and second bared surfaces being arranged on the bevelled faces opposite.

7. The stator according to claim 5, wherein the angle of inclination has a maximum value equal to 5 degrees.

8. The stator according to claim 4, wherein anchoring means are arranged between the first and second bared surfaces in order to maintain said surfaces in contact with one another.

9. The stator according to claim 4, wherein the means for maintaining include pressure shims arranged respectively in each slot and configured to exert a force in the radial direction, against the first and second branches arranged in each one of said slots.

10. The stator according to claim 1, wherein the first and second conductive segments each have a plunging between the first branches thereof, respectively the second branches thereof.

11. The stator according to claim 1, wherein each winding of the coil comprises a phase input conductive segment which comprises an input branch coated with insulation except the presence of a bared input surface, with the input branch being engaged into a slot, with the bared input surface coming into contact with the second bared surface opposite a second conductive segment at the beginning of the phase, with the means for maintaining being configured to maintain the bared input surface and the second bared surface in contact with each other.

12. The stator according to claim 1, which comprises at least one conductive connection segment which comprises connection branches, said conductive connection segment being coated with insulation except the connection branches which each comprise a bared connection surface, with the bared connection surfaces coming into contact with the second bared surfaces of second conductive segments (25, 33), with the means for maintaining (37, 38) being configured to maintain the bared connection surfaces and the second bared surfaces in contact with one another.

13. A method for manufacturing a stator of a rotary electric machine according to claim 1, which consists at least:
    in inserting the first branches of the first conductive segments in a first longitudinal direction of the body, inside the slots;
    in inserting the second branches of the second conductive segments in a second longitudinal direction of the body, inside the slots;
    in positioning in contact the first bared surfaces with the respective second bared surfaces, arranged opposite inside the slots;
    in setting in place the means for maintaining making it possible to maintain said first and second bared surfaces in contact with one another.

14. The method for manufacturing a stator according to claim 13, wherein the first and second conductive segments are each carried out beforehand by:
    constituting a pin in a sheet of conductive material;
    coating the pin with insulation;
    baring the branches of the pin in the zones that correspond to the bared surfaces in such a way as to remove the insulation on said surfaces;

folding the pin in order to give it the shape of a U with the two branches thereof.

15. A rotary electric machine of the motor or generator type, comprising a stator according to claim 1.

16. The stator according to claim 6, wherein the angle of inclination has a maximum value equal to 5 degrees.

* * * * *